United States Patent
Seven et al.

(10) Patent No.: US 9,969,859 B2
(45) Date of Patent: May 15, 2018

(54) HDPE-BASED BUFFER TUBES WITH IMPROVED EXCESS FIBER LENGTH IN FIBER OPTIC CABLES

(71) Applicant: Dow Global Technologies LLC, Midland, MI (US)

(72) Inventors: Karl M. Seven, Auburn, PA (US); Chester J. Kmiec, Phillipsburg, NJ (US)

(73) Assignee: Dow Global Technology LLC, Midland, MI (US)

( * ) Notice: Subject to any disclaimer, the term of this patent is extended or adjusted under 35 U.S.C. 154(b) by 175 days.

(21) Appl. No.: 14/647,149

(22) PCT Filed: Dec. 3, 2013

(86) PCT No.: PCT/US2013/072788
§ 371 (c)(1),
(2) Date: May 26, 2015

(87) PCT Pub. No.: WO2014/099350
PCT Pub. Date: Jun. 26, 2014

(65) Prior Publication Data
US 2015/0315355 A1 Nov. 5, 2015

Related U.S. Application Data

(60) Provisional application No. 61/740,638, filed on Dec. 21, 2012.

(51) Int. Cl.
| | | |
|---|---|---|
| *C08K 3/26* | (2006.01) | |
| *C08K 3/22* | (2006.01) | |
| *C08K 5/092* | (2006.01) | |
| *C08K 5/12* | (2006.01) | |
| *C08K 5/521* | (2006.01) | |
| *C08K 5/527* | (2006.01) | |
| *C08K 5/098* | (2006.01) | |
| *G02B 6/44* | (2006.01) | |

(52) U.S. Cl.
CPC .................. *C08K 3/26* (2013.01); *C08K 3/22* (2013.01); *C08K 5/092* (2013.01); *C08K 5/098* (2013.01); *C08K 5/12* (2013.01); *C08K 5/521* (2013.01); *C08K 5/527* (2013.01); *C08K 2003/2241* (2013.01); *C08K 2003/265* (2013.01); *G02B 6/443* (2013.01); *Y10T 428/139* (2015.01)

(58) Field of Classification Search
CPC . C08K 3/26; C08K 3/22; C08K 5/092; C08K 5/098; C08K 5/12; C08K 5/521; C08K 5/527
USPC ........................................................ 524/586
See application file for complete search history.

(56) References Cited

U.S. PATENT DOCUMENTS

| | | |
|---|---|---|
| 5,246,783 A | 9/1993 | Spenadel et al. |
| 5,324,800 A | 6/1994 | Welborn, Jr. et al. |
| 5,574,816 A | 11/1996 | Yang et al. |
| 6,496,629 B2 | 12/2002 | Ma et al. |
| 6,714,707 B2 | 3/2004 | Rossi et al. |
| 6,809,154 B2 | 10/2004 | Lindahl et al. |
| 6,922,512 B2 | 7/2005 | Nechitailo |
| 6,931,184 B2 | 8/2005 | Tedder et al. |
| 6,969,556 B2 | 11/2005 | Jeschke |
| 6,995,202 B2 * | 2/2006 | Lake, Jr. .................. C08J 3/226 524/285 |
| 7,036,281 B2 | 5/2006 | McNutt et al. |
| 7,442,736 B2 | 10/2008 | Jordan |
| 7,786,203 B2 | 8/2010 | Hanssen et al. |
| 7,970,247 B2 | 6/2011 | Barker et al. |
| 2002/0061934 A1 | 5/2002 | Hrivnak |
| 2004/0122132 A1 | 6/2004 | Xu et al. |
| 2006/0045439 A1 | 3/2006 | Brown et al. |
| 2007/0066733 A1 | 3/2007 | Hanssen et al. |
| 2008/0118749 A1 | 5/2008 | Aubee et al. |
| 2008/0139718 A1 * | 6/2008 | Reyntjens ................ C08J 3/226 524/396 |
| 2010/0084363 A1 | 4/2010 | Michie, Jr. et al. |
| 2010/0255236 A1 | 10/2010 | Malm et al. |
| 2011/0092625 A1 | 4/2011 | Xu et al. |
| 2013/0085244 A1 * | 4/2013 | Zhao ..................... C08F 110/02 526/126 |
| 2013/0225743 A1 | 8/2013 | Aubee et al. |

FOREIGN PATENT DOCUMENTS

| | | |
|---|---|---|
| EP | 1146078 A1 | 10/2001 |
| EP | 2402391 A1 | 1/2012 |
| JP | 2011111579 A | 6/2011 |
| JP | 2012-085742 A | 5/2012 |
| JP | 2012085742 A * | 5/2012 |
| JP | 2012131933 A | 7/2012 |
| WO | 2004/034115 A2 | 4/2004 |
| WO | 2005/047383 A1 | 5/2005 |

* cited by examiner

*Primary Examiner* — Kelechi Egwim
(74) *Attorney, Agent, or Firm* — Husch Blackwell LLP

(57) ABSTRACT

A composition comprising a blend of high density polyethylene (HDPE) and a nucleating component, with optional additives, in amounts effective to provide reduced shrinkage of the extruded composition and components made from the composition.

7 Claims, No Drawings

HDPE-BASED BUFFER TUBES WITH IMPROVED EXCESS FIBER LENGTH IN FIBER OPTIC CABLES

FIELD OF THE INVENTION

This invention relates to a composition composed of an extrudable blend of high density polyethylene (HDPE) and a nucleating component, fiber optic cable protective components made from the composition, and methods of reducing excess fiber length and post-extrusion shrinkage of such components.

BACKGROUND OF THE INVENTION

Optical fibers efficiently transmit information at high rates and long distances. These fibers are delicate and need to be protected. Conventionally, one or more optical fibers are incorporated into a fiber optic cable that protects the fibers from mechanical damage and/or adverse environmental conditions such as moisture exposure. Examples of protective components include extruded buffer tubes, core tubes and slotted core members.

A typical construction of a loose buffer tube optical cable, a common optic cable design, is described in US 2006/0045439 (Brown et al; The Dow Chemical Company). In brief, the optic cable is structured with buffer tubes positioned radially around a central strength member and wrapped in a helical rotation in the axial length. The arrangement of the buffer tubes in a helical rotation allows bending of the cable without significant stretching of the tube or optic fibers contained within. The buffer tubes are typically filled with optic cable grease incorporating hydrocarbon oil surrounding the optical fibers and eliminating air space. The grease provides a barrier against water penetration, which can be detrimental to the optic transmission performance. If a reduced number of buffer tubes are used, one or more foamed filler rods can be used as low cost spacers to occupy one or more buffer tube positions to maintain cable geometry. Typically, a water blocking functionality is incorporated into the cable core via use of components such as yarns or core wraps that incorporate water-swellable super absorbent polymers. The elements are surrounded within a jacket, which is typically composed of a polyethylene.

Design elements for loose buffer tube cables can vary, for example, according to the size and materials of construction for the central strength and tensile member, the dimensions and number of buffer tubes, and the use of metallic armors and multiple layers of jacketing material. Other components such as water blocking treatments on the central strength member, or ripcords to aid removal of jacketing for installation are also common elements. Another variation is to eliminate the buffer tube grease and employ super-absorbent water-blocking functionality such as yarns or powders within the buffer tubes.

US 2006/0045439 also describes a typical optic cable incorporating a core tube (also known as a "central tube"). In brief, the optic fibers are positioned near the center of the cable within a central, cylindrical core tube. The optical fibers are in bundles embedded in a filling material surrounded by a cylindrical core tube. Ripcords, situated on the surface of the core tube, are surrounded by water blocking tape. A corrugated coated steel cylinder surrounds the tape to protect the optic fiber bundles. Wire strength members provide the cable with strength and stiffness. The components are surrounded by a jacket, which is typically composed of polyethylene. In the described design, all of the mechanical functions are incorporated into the outer sheathing system composed of the core tube, polyolefin jacketing layers, tensile and compressive strength members, metallic armors, core wraps, water blocking components and other components. The core tube is typically larger in diameter than a buffer tube to accommodate the bundles of optic fibers or ribbon components containing the optic fibers. A core tube typically contains a water blocking grease surrounding the optic fiber components, although dry designs incorporating super-absorbent polymer elements for water-blocking can be used. The optimal material characteristics for a core tube component are similar to those of a buffer tube application.

US 2006/0045439 further describes an embodiment of an optical cable which incorporates a slotted core tube. In brief, the slotted core tube has a central member to prevent buckling and control shrinkage of the extruded slotted core profile shape. The slotted core tube includes slots in which optical fibers are positioned. A filler rod can optionally occupy one or more slots. The slotted core is surrounded by a water blocking layer which can include one or more ripcords. The water blocking layer is surrounded by a dielectric strength member layer, which in turn is surrounded by a jacket typically composed of polyethylene.

Optical cables are generally manufactured using high modulus materials to provide the cable and extruded optical cable protective components (e.g., buffer tubes, core tubes and slotted core tubes) with good crush strength. Extruded optical cable protective components are typically filled with hydrocarbon-based greases (also referred to as "gels") that provide a water-blocking function. These greases typically contain low molecular weight hydrocarbon oils that can be absorbed into the polymeric tube materials, adversely affecting mechanical properties such as decreased flexural modulus and crush resistance. A decrease in crush resistance can compromise optic cable performance by making the optic fibers more prone to mechanical stress resulting in an increase in signal attenuation. In addition, under several application conditions, the loss of crush resistance increases the possibility of catastrophic failure via mechanical damage to the optic fibers. Thus, minimal oil absorption with good retention of flexural modulus and crush resistance, commonly referred to as "grease compatibility," is an important performance characteristic for polymer materials to be used for the extruded optical cable protective components.

Different polymeric materials have shown different grease (gel) absorption characteristics. For example, polybutylene terephthalate (PBT) has shown only minimal change in physical properties following conditioning in optic grease, whereas polyolefin polymers have shown greater changes in properties. Higher crystalline polyolefin materials have typically shown a much reduced change in properties compared to more amorphous materials, and impact modified polypropylene (IMPP) is very prone to grease absorption.

Another important performance parameter for extruded optical cable protective components is post-extrusion shrinkage characteristics. When extruded optical cable protective components containing optical fibers are fabricated, it is important to the optical signal transmission that the optic fibers do not have excess slack, referred to as "excess fiber length" or EFL. Rapid shrinkage of an optical cable protective component which occurs during extrusion processing typically does not contribute to EFL because the optic fibers are moderately tensioned during the process. However, post-extrusion shrinkage of an extruded protective component (e.g., buffer tube) can result in EFL for the contained optical fibers causing the fibers to extend beyond the ends of the protective component, leading to stresses on the optic fibers and attenuation of the signal.

Such shrinkage can occur late in the fabrication process after the fiber tensioning capability has been overcome by frictional forces or following manufacture of the component. Two primary mechanisms for shrinkage of an extruded optical cable protective component are strain recovery of the viscoelastic stretching of the polymeric melt during the tube shaping extrusion process, and solid state annealing shrinkage resulting from a continuing re-crystallization of the polymeric matrix. To provide an optical cable protective component that exhibits low post extrusion shrinkage and a low EFL, it is desirable to use materials that can provide a fast relaxation of viscoelastic melt stresses and minimize subsequent annealing shrinkage.

Polybutylene terephthalate (PBT) is often used for buffer tube applications due to performance attributes of high stiffness and deformation resistance (with flexural modulus>2,400 MPa) and low EFL caused by post-extrusion shrinkage. However, PBT is relatively expensive, especially on a cost per volume basis, compared to polyolefin-based compounds.

There has also been use of lower cost polyolefin materials such as high density polyethylene (HDPE) and impact modified polypropylene, in both buffer tube and core tube applications. However, because HDPE has a lower modulus, a lower crush resistance and an increased level of post extrusion shrinkage compared to materials such a polypropylene (PP) and PBT, special fabrication care is required to avoid high levels of EFL that are detrimental to signal attenuation performance. In addition, although HDPE provides a higher level of optic grease compatibility compared to IMPP, both IMPP and HDPE have substantially lower modulus and crush resistance than PBT, especially after grease exposure. Consequently, the use of HDPE has been limited in replacing PBT or PP in buffer tube applications.

It would be desirable to provide a material based on HDPE that can be used in fabricating extruded optical cable protective components having reduced shrinkage and EFL for use in fiber optic cables.

SUMMARY OF THE INVENTION

In one embodiment, the invention is a composition comprising:
A. high density polyethylene (HDPE); and
B. a nucleating component consisting essentially of:
(1) a cyclohexanedicarboxylic acid metal salt; and
(2) a nucleating agent selected from the group consisting of metal carbonates, metal oxides, metal salts of aliphatic or aromatic mono- or dicarboxylic acids, $C_8$ to $C_{24}$ saturated fatty acids, crystalline silica (quartz), $C_1$ to $C_{18}$ alkyl benzoates, dibenzylidene sorbitols and derivatives, 2,6-naphthalene dicarboxamides, polyvinylcyclohexane, high crystallinity polypropylenes (HCPPs), branched polypropylenes, and combinations thereof.

In embodiments, the composition comprises 95 to 99.5 wt % of the high density polyethylene (HDPE), and 0.5 to 5 wt % of the nucleating component, with the weight percentages (wt %) of A and B based upon the total weight of the A+B components.

In embodiments, the nucleating component of the composition consists essentially of 7 to 10 wt % of the cyclohexanedicarboxylic acid metal salt, and 90 to 93 wt % of the nucleating agent, with the weight percentages (wt %) of the cyclohexanedicarboxylic acid metal salt and the nucleating agent based upon the total weight of the nucleating component.

In embodiments, the high density polyethylene (HDPE) is a unimodal HDPE.

In embodiments, the 1-day shrinkage (at 21° C.) of the extruded composition is 15 to 30% less than an extruded composition having the same formulation but without the nucleating component or without one of either the cyclohexanedicarboxylic acid metal salt component or the secondary nucleating agent.

In another aspect, the invention provides a buffer tube or other protective component (e.g., core tube, slotted core tube, etc.) for a fiber optic cable made from the composition as disclosed herein.

In yet another aspect, the invention provides a method of reducing excess fiber length in a polymeric buffer tube or other protective component (e.g., core tube, slotted core tube, etc.), the method comprising extruding the buffer tube or other protective component from the composition as disclosed herein.

DETAILED DESCRIPTION OF THE PREFERRED EMBODIMENT

Definitions

Unless stated to the contrary, implicit from the context, or customary in the art, all parts and percents are based on weight. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 0.9, 1.1, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, and the various characteristics and properties by which these compositions and the optical cable protective components made from these compositions are defined.

"Wire" and like terms mean a single strand of conductive metal, e.g., copper or aluminum, or copper cladded aluminum, or a single strand of optical fiber.

"Cable", "power cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Electrical insulation applications are generally divided into low voltage insulation which are those less than 1 kV (one thousand volts), medium voltage insulation which ranges from 1 kV k to 30 kV, high voltage insulation which ranges from 30 kV to 150 kV, and extra high voltage insulation which is for applications above 150 kV (as defined by the IEC, the International Electrotechnical Commission). Typical cable designs are illustrated in U.S. Pat. No. 5,246,783, U.S. Pat. No. 6,496,629 and U.S. Pat. No. 6,714,707. A typical cable design is illustrated in US 2006/0045439.

"Composition" and like terms mean a mixture or blend of two or more components.

"Interpolymer" and like terms mean a polymer prepared by the polymerization of at least two different types of monomers. The generic term interpolymer thus includes copolymers (employed to refer to polymers prepared from two different types of monomers), and polymers prepared from more than two different types of monomers.

"Comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Overview

This invention is directed to extruded optical cable protective components fabricated from an extrudable blend of high density polyethylene (HDPE) and a nucleating component, with optional additives/fillers, present in amounts effective to provide a balance of flexural modulus, impact strength, grease resistance and reduced (low) shrinkage of the extruded component.

In embodiments, the composition provides an extruded component having a secant modulus (2% secant) of at least 500 MPa, elongation at break of at least 500%, and a shrinkage of the extruded component of less than 1.5% after 24 hours at 21° C.

In embodiments, the 24 hour shrinkage (at 21° C.) of the extruded composition (HDPE+nucleating component) is typically 15 to 30% less, and more typically 20 to 25% less, than the extruded HDPE polymer composition having the same formulation but without the nucleating component or without one of either the cyclohexanedicarboxylic acid metal salt component or the secondary nucleating agent(s).

High Density Polyethylene (HDPE)

The polymer blend composition includes a high density polyethylene (HDPE) polymer. As used herein, the terms "high density polyethylene" polymer and "HDPE" polymer refer to a homopolymer or copolymer of ethylene having a density of greater than 0.940 g/cm$^3$.

The HDPE polymer typically has a density of from 0.940 to 0.980, more typically at least 0.942, more typically at least 0.970, and more typically at least 0.944, and typically from 0.944 to 0.965, and more typically from 0.945 to 0.955, g/cm$^3$, as measured in accordance with ASTM D-792. In some embodiments, the HDPE polymer is a copolymer of ethylene having a density of from 0.940 g/cm$^3$ to 0.958 g/cm$^3$.

The HDPE polymer typically has a melt index (MI, I$_2$) of from 0.01 to 10, more typically of at least 0.5, and typically from 0.6 to 1.0, and more typically from 0.7 to 0.9, g/10 minutes as measured in accordance with ASTM D-1238, Condition 190° C./2.16 kilograms (kg).

The HDPE polymer typically has a melt flow rate (MFR) of less than or equal to 1.6, more typically less than 1.5, and typically from 1.3 to 1.7, more typically from 1.4 to 1.6, g/10 minutes, as measured in accordance with ASTM D-1238, Condition 230° C./2.16 kg.

The HDPE polymer is a semi-crystalline polymer, typically with a crystallinity of from 55 to 90% as measured by differential scanning calorimetry (DSC).

The number average molecular weight, Mn, for HDPE usually ranges from 50,000 to 250,000.

The HDPE polymer comprises at least 50, preferably at least 60 and more preferably at least 80, wt % of units derived from ethylene monomer units. The other units of the ethylenic interpolymer are typically derived from one or more α-olefins. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Illustrative ethylenic interpolymers include copolymers of ethylene/propylene, ethylene/butene, ethylene/1-hexene, ethylene/1-octene, and the like. Illustrative ethylenic terpolymers include ethylene/propylene/1-octene, ethylene/propylene-/butene, ethylene/butene/1-octene, ethylene/propylene/diene monomer (EPDM) and ethylene/butene/styrene.

The HDPE polymers used in the practice of this invention are non-functionalized polymers, i.e., they do not contain functional groups, such as hydroxyl, amine, amide, etc. As such polymers like ethylene vinyl acetate, ethylene methyl or ethyl acrylate and the like are not HDPE polymers within the context of this invention.

The HDPE polymers used in the invention are well known in the literature and can be prepared by known techniques.

In embodiments, the HDPE polymer is a unimodal HDPE. A "unimodal HDPE" is a HDPE polymer having a molecular weight distribution (MWD) (measured by gel permeation chromatography (GPC)) that does not exhibit multiple component polymers, that is, no humps, shoulders or tails exist or are substantially discernible in the GPC curve, and the degree of separation is zero or substantially close to zero. Molecular weight distribution is reflected in an $M_w/M_n$ ratio of from 10 to 18, preferably 12 to 16. $M_w$ is the weight average molecular weight, $M_n$ is the number average molecular weight, and the $M_w/M_n$ ratio can be referred to as the polydispersity index, which is a measure of the breadth of the molecular weight distribution.

In embodiments, the HDPE polymer is a unimodal HDPE having a relatively high molecular weight of from 80,000 to 160,000 (measured by GPC).

Unimodal HDPE polymers can be produced using a conventional single stage polymerization (single reactor) process, such as a solution, slurry or gas-phase process, using a suitable catalyst such as a Ziegler-Natta or Phillips type catalyst or a single site metallocene catalyst, as described, for example, in U.S. Pat. No. 5,324,800. Unimodal HDPE resins are well known and commercially available in various grades, for example, under the tradenames DGDL-3364NT, available from The Dow Chemical Company, and Petrothene LR765701, available from LyondellBasell Industries.

The amount of the HDPE polymer present in the composition is typically at least 95 wt %, typically from 95 to 99.5 wt %, and more typically from 97 to 99 wt %, based on the total weight of the HDPE polymer and the nucleating component (exclusive of the weight for any additives and/or fillers present). All individual values and subranges from 95 to 99.5 wt % are included and disclosed herein, for example from 96 to 99.5 wt % or from 97 to 99 wt %, etc.

Nucleating Component

The HDPE polymer is blended with a nucleating component, which consists essentially of a cyclohexanedicarboxylic acid metal salt combined with one or more of a second nucleating agent (interchangeably called a "secondary nucleating agent") of a select group of compounds as described herein.

As used herein, the terms "nucleating component" and "nucleating agent" refer to an additive which forms nuclei in a polymer melt and increases the rate of nucleation, enabling faster crystallization of the polymer to help stiffen the composition during cooling. The nucleating component is blended (typically melt blended) with the HDPE polymer in a post-reactor procedure.

Embodiments of the cyclohexanedicarboxylic acid metal salt component comprise a metal selected from the group consisting of calcium, sodium, zinc, potassium, magnesium and aluminum. Non-limiting examples of the cyclohexanedicarboxylic acid metal salt include 1,2-cyclohexanedicarboxylic acid calcium salt (1:1) or (2:1), 1,2-cyclohexanedicarboxylic acid sodium salt (1:2) (1R,2S)-rel-, 1,4-cyclohexanedicarboxylic acid sodium salt (1:2) trans-, 1,2-cyclohexanedicarboxylic acid sodium salt (1:2), 1,3-cyclohexanedicarboxylic acid sodium salt (1:2), and 1,4-cyclohexanedicarboxylic acid sodium salt (1:2).

The secondary nucleating agents include one or more metal carbonates, metal oxides, metal salts of aliphatic or aromatic mono- or dicarboxylic acids, $C_8$ to $C_{24}$ saturated fatty acids, crystalline silica (quartz), $C_1$ to $C_{18}$ alkyl benzoates, dibenzylidene sorbitols and derivatives, 2,6-naphthalene dicarboxamides, polyvinylcyclohexane, high crystallinity polypropylenes (HCPPs), branched polypropylenes, and combinations thereof.

Examples of metal carbonates include calcium carbonate, magnesium carbonate and limestone. Examples of metal oxides include titanium dioxide ($TiO_2$) including rutile $TiO_2$, aluminum oxide and zinc oxide. Examples of metal salts of aliphatic or aromatic mono- or dicarboxylic acids include metal acetates such as sodium acetate and potassium acetate; metal stearates such as calcium stearate, sodium stearate and zinc stearate; metal benzoates such as sodium benzoate, calcium benzoate, potassium benzoate, lithium benzoate, zinc benzoate and magnesium benzoate; $C_1$ to $C_{18}$ alkyl benzoates such as p-tert-butyl benzoate, metal pimelates such as calcium pimelate, barium pimelate and magnesium pimelate; and metal suberates such as calcium suberates, magnesium suberate, zinc suberate and sodium suberate. Examples of $C_6$ to $C_{24}$ saturated fatty acids include stearic acid, palmitic acid, oleic acid, caproic acid and behenic acid.

Examples of derivatives of dibenzylidene sorbitol include 1,3:2,4-di(benzylidene)sorbitol, 1,3:2,4-di(p-methylbenzylidene)sorbitol, and 1,3:2,4-di(p-ethylbenzylidene)sorbitol.

Examples of 2,6-naphthalene dicarboxamides include N,N'-di-$C_5$-$C_5$-cycloalkyl-2,6-naphthalene dicarboxamide compounds such as N,N'-dicyclohexyl-2,6-naphthalene dicarboxamide and N,N'-dicyclooctyl-2,6-naphthalene dicarboxamide.

High crystallinity polypropylenes (HCPPs), described, for example, in U.S. Pat. No. 7,361,720 (Pierini), are polypropylene resins which generally have a crystallinity of greater than 70%, a low melt flow rate (MFR) of less than 7 g/10 minutes at 230.° C./2.16 kg, a narrow molecular weight distribution ($M_w/M_n$) of less than 5, a 1% secant modulus of greater than 300,000 p.s.i. and low xylene solubles of less than 2 wt %. HCPPs are commercially available, for example, under the tradename Borclean™ HC300BF, commercially available from Borealis AG.

Branched polypropylenes include polypropylene homopolymers and copolymers. Commercially available examples of branched polypropylenes include Daploy™ HMS-PP, commercially available from Borealis AG.

The amount of the nucleating component in the composition is typically at least 0.5 wt %, typically from 0.5 to 5 wt %, more typically from 0.1 to 4 wt % and even more typically from 0.5 to 2 wt %, based on the total weight of the HDPE polymer and the nucleating component (exclusive of the weight for any additives and/or fillers present). All individual values and subranges from 0.5 to 5 wt % are included and disclosed herein, for example from 1 to 5 wt %, or from 2 to 4 wt %, etc.

The nucleating component is typically composed of from 7 to 10 wt % of the cyclohexane dicarboxylic acid metal salt, and from 90 to 93 wt % of one or more of the secondary nucleating agent(s), the weight percentages (wt %) based upon the total weight of the nucleating component.

Additives

The composition may optionally contain additives including but not limited to antioxidants, processing aids, fillers, pigments or colorants, coupling agents, ultraviolet stabilizers (including UV absorbers), tackifiers, scorch inhibitors, antistatic agents, slip agents, plasticizers, lubricants, viscosity control agents, anti-blocking agents, surfactants, extender oils, acid scavengers, metal deactivators, and the like. If present, additives are typically used in amounts ranging from 0.01 wt % or less to 10 wt % or more, based on the total weight of the composition. Additives can be added neat or as part of a masterbatch.

Examples of antioxidants include, but are not limited to, Naugard® Super Q (polymerized 1,2-dihydro-2,2,4-trimethylquinoline), commercially available from Chemtura Corporation.

Examples of processing aids include, but are not limited to, fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; and silicone fluids and polysiloxanes.

Examples of fillers include, but are not limited to, various flame retardants, clays, precipitated silica and silicates, fumed silica, metal sulfides and sulfates such as molybdenum disulfide and barium sulfate, metal borates such as barium borate and zinc borate, metal anhydrides such as aluminum anhydride, ground minerals, and carbon blacks. If present, fillers are generally added in conventional amounts, e.g., from 5 wt % or less to 50 or more wt % based on the weight of the composition.

In a preferred embodiment, the composition is composed of a unimodal HDPE, and the nucleating component consists essentially of a cyclohexanedicarboxylic acid metal salt combined one or more of calcium carbonate, magnesium carbonate, titanium dioxide and calcium stearate.

Compounding

The polymer composition of the invention can be produced by any suitable method. For example, the nucleating agent and any additives can be added to a melt containing the HDPE polymer. Such compounding of the HDPE and nucleating component can be performed by blending, for example, using an internal batch mixer such as a Banbury mixer or Bolling internal mixer. Alternatively, continuous single or twin screw mixers can be used, such as a Farrel continuous mixer, a Werner and Pfleiderer twin screw mixer, or a Buss kneading continuous extruder. The nucleating component may be introduced into the HDPE polymer composition alone or in the form of a masterbatch containing the HDPE polymer and optionally one or more additives.

Articles of Manufacture

An optical fiber cable is typically fabricated in a series of manufacturing steps including initially manufacturing optical transmission fibers, which can have a polymeric protective coating thereon, and assemble the fibers into bundles or ribbon cable configurations or directly incorporating the fibers into the cable fabrication. Typically, the polymer composition is prepared in a reactor-extruder equipped with a cable-coating die and after the components of the composition are formulated, the composition is extruded over the cable as the cable is drawn through the die. Typically for buffer and core tubes, one or more optic fibers or fiber assemblies and grease are fed into the back of a wire and cable cross-head and exit the cross-head within the molten tubular component which is then cooled and solidified, e.g., in a water system.

Processing conditions are optimized to provide a component with no or minimal post extrusion shrinkage such that excess slack in the optic fiber components does not occur. The extruded component, along with other components such as central components, armors, wraps, etc., are then processed in one or more subsequent steps to produce the cable construction, typically including the application of a polymeric jacketing.

The incorporation of the described nucleating agents and the use of higher molecular weight polyethylene, respectively, maximizes initial crystallization of the extruded material and increases melt viscoelastic relaxation speeds to minimize subsequent annealing shrinkage of the extruded material. The compositions of the invention provide an enhanced balance of high crush resistance, good filler compatibility and adequate cold impact performance as compared to other polyolefin materials such as polypropylene. The compositions also provide extruded components that exhibit improved grease absorption performance compared to conventional impact modified polypropylene (IMPP) when lower cost gels/greases such as LA444 (available commercially from the Stewart Group), are used.

The invention is described more fully through the following examples. Unless otherwise noted, all parts and percentages are by weight.

Specific Embodiments

Materials

The following materials were used in the examples.

DGDL-3364 NT is a high molecular weight, Unipol gas phase unimodal HDPE with a density of 0.945 g/cm$^3$, a melt index (MI, I$_2$) of 0.80 g/10 min. (190° C./2.16 kg), and a tensile strength of 22.1 MPa (3,400 psi), available from The Dow Chemical Company.

DGDA-7590 NT is a Unipol gas phase bimodal HDPE with a density of 0.949 g/cm$^3$, melt index of 0.08 g/10 min. (190° C./2.16 kg), tensile strength (yield) of 24.8 MPa (3,600 psi) (ASTM D638), and flexural modulus of 1,030 MPa (ASTM D790), available from The Dow Chemical Company.

DMDA-1250 NT is a Unipol gas phase bimodal HDPE with a density of 0.955 g/cm$^3$, melt index of 1.5 g/10 min. (190° C./2.16 kg), tensile strength (yield) of 23.5 MPa (3,410 psi) (ASTM D638), and flexural modulus (2% Secant) of 1,680 MPa (ASTM D790), available as CONTINUUM™ DMDA-1250 NT 7 from The Dow Chemical Company.

HPN-20E is a 1,2-cyclohexanedicarboxylic acid calcium salt with zinc stearate (nucleating agent), available under the tradename Hyperform® HPN-20E from Milliken Chemicals, Spartanburg, S.C.

NA-27 is a phosphate ester compound mixture (nucleating agent), available commercially from Adeka Corporation.

NA-11 is a 2,2-methylenebis(4,6-di-tert-butylphenyl) phosphate sodium salt (nucleating agent), available from Adeka Corporation.

G-2T is a fine particle size calcium carbonate (CaCO$_3$), available under the tradename Hubercarb® G2T from Huber Engineered Materials.

R-104 is a rutile titanium dioxide (TiO$_2$) pigment, available from DuPont under the tradename Ti-Pure® R-104.

AG609 is a talc, available under the tradename MICROTUFF® AG609 from Specialty Minerals Inc., Bethlehem, Pa.

Example 1

Blends of a commercial unimodal HDPE (DGDL-3364 NT) and HPN-20 nucleating agent (1,2-cyclohexane dicarboxylic acid calcium salt) were formulated as shown in Table 1, extruded onto wire, and tested for shrinkage.

A composition blend was prepared by introducing the HDPE polymer (DGDL-3364 NT) and 1,2-cyclohexane dicarboxylic acid calcium salt (HPN-20) as a nucleating agent into a Brabender mixing bowl. The melt temperature was 185° C., zones 1 and 2 were 185° C. and 180° C., and screw rpm was 50 with flux time of 5 min. After mixing while still hot (about 150° C.), the composition was compressed to a thickness of 7.5 mm between the platens of a compression mold. The material was then cut into strands which were fed into a Berlyn pelletizing unit and pelleted. Specimens are then prepared by extruding the material through a wire coating die onto 14 gauge wire. The wire samples had an outside diameter of about 2.9 mm and a wall thickness of 0.635 mm. The wire samples were then subjected to 21° C. for 24 hours.

Shrinkage of the extruded samples were measured after aging at room temperature and at least five (5) samples were measured for each material. A final 5-foot test specimen was prepared using a steel V channel to keep the sample straight and a ruler used for length measurement. The conductor was then stretched and removed and the resulting polymer tube was aged for one (1) day at room temperature and then seven (7) days at room temperature. The sample lengths were measured at the 1-day and again at the 7-day times. The aged specimens were placed in the V-channel and the change in length measured using a caliper instrument with +/−0.0005-in. resolution. The average shrinkage value was reported. Shrinkage data of test sample (S1) was compared to the data for the HDPE control sample (C1) to determine the percent (%) improvement provided by the HPN-20 nucleating agent.

TABLE 1

|  | wt % | |
| --- | --- | --- |
|  | C1 | S1 |
| DGDL-3364 NT (HDPE) | 100.00 | 99.90 |
| HPN-20 (nucleating agent) | — | 0.10 |
| 1 day Shrinkage (inch) @ 21° C. | 0.822 | 0.696 |
| % Improvement | — | 15.3% |

The results in Table 1 show a reduction in shrinkage of about 15% of the HPN-20 nucleated HDPE specimen (S1) compared to the control specimen (C1) prepared from the HDPE polymer alone.

Example 2

Blends of the unimodal HDPE (DGDL-3364 NT) and nucleating agents listed in Table 2 (HPN-20, NA-27, NA-11, G-2T) were prepared and tested for shrinkage as described in Example 1.

TABLE 2

|  | wt % | | | | |
| --- | --- | --- | --- | --- | --- |
|  | C2 | S2 | S3 | S4 | S5 |
| DGDL-3364 NT (HDPE) | 100.00 | 99.90 | 99.90 | 99.85 | 97.00 |
| HPN-20 | — | 0.10 | — | — | — |
| NA-27 | — | — | 0.10 | — | — |
| NA-11 | — | — | — | 0.15 | — |
| G-2T (CaCO$_3$) | — | — | — | — | 3.00 |
| 1 day Shrinkage [inch] @ 21° C. | 0.822 | 0.696 | 0.873 | 0.979 | 0.710 |
| % Change (+/−) | — | +15.3% | −6% | −19% | +13.6% |

The results show favorable shrinkage reduction for samples S2 and S5 using the HPN-20 and G-2T (CaCO$_3$) type nucleating agents, but poor results for samples S3 and S4 using the NA-27 (phosphate ester compound mixture) and NA-11 (phosphate sodium salt) type nucleating agents.

Example 3

Blends of the unimodal HDPE (DGDL-3364 NT) and two bimodal HDPE polymers (DGDA-7590 NT, DMDA-1250 NT) with the listed nucleating agents (HPN-20, NA-27, NA-11, G-2T) as shown in Table 3, were prepared and tested for shrinkage as described in Example 1.

TABLE 3

|  | wt % | | | | | | | | |
| --- | --- | --- | --- | --- | --- | --- | --- | --- | --- |
|  | C3 | C4 | C5 | S6 | S7 | S8 | S9 | S10 | S11 |
| DGDL-3364 NT | 100.0 | — | — | 99.90 | 99.90 | 99.85 | 99.05 | — | — |
| DGDA-7590 NT | — | 100.0 | — | — | — | — | — | 99.9 | — |
| DMDA-1250 NT | — | — | 100.0 | — | — | — | — | — | 98.00 |
| HPN-20 | — | — | — | 0.10 | — | — | — | 0.10 | — |
| NA-27 | — | — | — | — | 0.10 | — | — | — | — |
| NA-11 | — | — | — | — | — | 0.15 | — | — | — |
| G-2T (CaCO$_3$) | — | — | — | — | — | — | 0.95 | — | 2.00 |
| 1 day Shrinkage [inch] @ 21° C. | 0.822 | 0.714 | 0.565 | 0.696 | 0.873 | 0.979 | 0.71 | 0.705 | 0.681 |
| % Change (+/−)- | — | — | — | +31.3% | +15.3% | −6% | −19% | +13.6% | +13% | −20.5% |

The results in Table 3 show improved shrinkage results with the blends of the HDPE unimodal resin and nucleating agents HPN-20 and G-2T (CaCO$_3$) (S6, S9) compared to the corresponding blends of the HDPE bimodal resins (S10, S11).

The unimodal HDPE blends in sample S6 (with HPN-20) and sample S9 (with G-2T) showed a +15% and +13.6% shrinkage improvement, respectively, compared to the unimodal HDPE resin alone (C3). By comparison, the bimodal HDPE blends in sample S10 (with HPN-20) and sample S11 (with G-2T) had comparatively unfavorable results, i.e., +1.3% and −20.5% shrinkage improvement compared to the respective bimodal HDPE resins alone (C4, C5). In S11, the % change is with respect to C5 results. The % change of C5 is with respect to C3 results.

Example 4

Blends of the unimodal HDPE (DGDL-3364 NT) and the HPN-20 and/or G-2T (CaCO$_3$) nucleating agents as shown in Table 4, were prepared and tested for shrinkage as described in Example 1.

TABLE 4

|  | wt-% | | | |
| --- | --- | --- | --- | --- |
|  | C6 | S12 | S13 | S14 |
| DGDL-3364 | 100.00 | 99.9 | 98.9 | 99.0 |
| HPN-20 | — | 0.1 | 0.1 | — |
| G-2T (CaCO$_3$) | — | — | 1.0 | 1.0 |
| 1 day Shrinkage [inch] @ 21° C. | 0.822 | 0.696 | 0.658 | 0.71 |

The results in Table 4 indicate an improvement in shrinkage of the unimodal HDPE blend of sample S13 which combined the HPN-20 nucleating agent (1,2-cyclohexane dicarboxylic acid calcium salt) with G-2T (CaCO$_3$) compared to the unimodal HDPE blends with either HPN-20 or G-2T used alone (S12, S14).

Example 5

Blends of the unimodal HDPE (DGDL-3364 NT) and the nucleating agents as shown in Table 5, were prepared and tested for shrinkage as described in Example 1.

TABLE 5

| | wt-% | | | |
|---|---|---|---|---|
| | C7 | S15 | S16 | S17 |
| DGDL-3364 NT | 100.000 | 98.940 | 98.810 | 98.900 |
| HPN-20 | — | — | — | 0.100 |
| NA-11 | — | — | 0.140 | — |
| G-2T (CaCO$_3$) | — | 0.950 | 0.945 | 1.000 |
| R-104 (rutile TiO$_2$) | — | 0.110 | 0.105 | — |
| AG609 (talc) | — | — | — | — |
| 1 day Shrinkage [inch] 21° C. | 0.833 | 0.769 | 0.928 | 0.658 |
| % Change+/− | — | +7.7% | −11.4% | +21.0% |

The results in Table 5 indicate a significant improvement in shrinkage at +21.0% of the blend of the unimodal HDPE polymer combined the HPN-20 (1,2-cyclohexane dicarboxylic acid calcium salt) and G-2T (CaCO$_3$) nucleating agents (S17) compared to the HDPE blends with G-2T (CaCO$_3$) with other nucleating agents (R-104 (S15); and R-104/NA-11 (S16)).

Table 6 shows a repeated experiment with the nucleated DGDL-3364 NT HDPE polymer with values calculated by % shrinkage in length. Two different heat aged tests were completed on samples. The PE90 test involved heating the samples to 95° C. for 4 hours and measuring the shrinkage as per method above. The cyclic aging test subjected samples to five cycles from 40° C. to 100° C. in order to roughly simulate potential temperature extremes that the buffer tube may be exposed to in the outdoor environment.

TABLE 6

| | wt-% | | | |
|---|---|---|---|---|
| | C8 | S18 | S19 | S20 |
| DGDL-3364 NT | 100.00 | 99.90 | 98.90 | — |
| DMDA-1250 NT | — | — | — | 100.00 |
| HPN-20 | — | 0.10 | 0.10 | — |
| G-2T (CaCO$_3$) | — | — | 1.0 | — |
| % Shrinkage (PE90) (95° C./4 hours) +/− .06 | 1.72 | 1.59 | 1.32 | 1.32 |
| % Change +/− (PE90) | — | 8 | 23 | 23 |
| % Shrinkage +/− .06 (cyclic aging test) | 2.16 | 1.81 | 1.68 | 1.46 |
| % Change +/− (cyclic) | — | 16 | 22 | 32 |

The results in Table 6 show that both shrinkage values (PE90 and cyclic aging) trended similarly for the control (C8) and each sample. The nucleated sample (S19) with both HPN-20 and G2T performed significantly better than the control (C8) and the sample (S18) with only the HPN-20.

It is specifically intended that the present invention not be limited to the embodiments and illustrations contained herein, but include modified forms of those embodiments including portions of the embodiments and combinations of elements of different embodiments as come within the scope of the following claims.

We claim:

1. A composition consisting of:
   A. 95 to 99.5 wt % of a unimodal, high density polyethylene (HDPE) having a density greater than 0.94 g/cc; and
   B. 0.1 to 4 wt % of a nucleating component consisting essentially of:
      (1) a cyclohexanedicarboxylic acid metal salt; and
      (2) a nucleating agent selected from the group consisting of metal carbonates, metal oxides, C$_8$ to C$_{24}$ saturated fatty acids, crystalline silica (quartz), C$_1$ to C$_{18}$ alkyl benzoates, dibenzylidene sorbitols and derivatives, 2,6-naphthalene dicarboxamides, polyvinylcyclohexane high crystallinity polypropylenes (HCPPs), branched polypropylenes, and combinations thereof; and
   C. optionally, one or more of an antioxidant, processing aid, filler, pigment, colorant, coupling agent, ultraviolet stabilizer, tackifier, scorch inhibitor, antistatic agent, slip agent, plasticizer, lubricant, viscosity control agent, anti-blocking agent, surfactant, extender oil, acid scavenger, and metal deactivator;
   wherein the weight percentages (wt %) of A and B are based upon the total weight of the A+B components, wherein the nucleating component consists essentially of 7 to 10 wt % of the cyclohexanedicarboxylic acid metal salt, and 90 to 93 wt % of the nucleating agent, each based on the total weight of the nucleating component B.

2. The composition of claim 1, wherein the cyclohexanedicarboxylic acid metal salt is selected from the group consisting of 1,2-cyclohexanedicarboxylic acid calcium salt (1:1) or (2:1), 1,2-cyclohexanedicarboxylic acid sodium salt (1:2) (1R,2S)-rel-, 1,4-cyclohexanedicarboxylic acid sodium salt (1:2) trans-, 1,2-cyclohexanedicarboxylic acid sodium salt (1:2), 1,3-cyclohexanedicarboxylic acid sodium salt (1:2), and 1,4-cyclohexanedicarboxylic acid sodium salt (1:2).

3. The composition of claim 1, wherein the nucleating agent is selected from the group consisting of calcium carbonate, magnesium carbonate, limestone, titanium dioxide, aluminum oxide, and zinc oxide.

4. The composition of claim 1, wherein the nucleating agent is a metal salt of an aliphatic or aromatic mono- or dicarboxylic acid selected from the group consisting of metal acetates, metal stearates, metal benzoates, metal pimelates and metal suberates.

5. The composition of claim 1, wherein a 1-day shrinkage (at 21° C.) of the extruded composition is 15 to 30% less than an extruded composition having the same formulation but without the nucleating component or without one of either the cyclohexanedicarboxylic acid metal salt component or the secondary nucleating agent.

6. A buffer tube for a fiber optic cable made from the composition of claim 1.

7. A method of reducing excess fiber length in a polymeric buffer tube, the method comprising extruding the buffer tube from the composition of claim 1.

* * * * *

UNITED STATES PATENT AND TRADEMARK OFFICE
CERTIFICATE OF CORRECTION

PATENT NO. : 9,969,859 B2
APPLICATION NO. : 14/647149
DATED : May 15, 2018
INVENTOR(S) : Karl M. Seven and Chester J. Kmiec Page 1 of 1

It is certified that error appears in the above-identified patent and that said Letters Patent is hereby corrected as shown below:

On the Title Page

Item (73) Assignee: Replace "Dow Global Technology LLC" with --Dow Global Technologies LLC--.

Signed and Sealed this
Nineteenth Day of June, 2018

Andrei Iancu
*Director of the United States Patent and Trademark Office*